(12) United States Patent
Janus et al.

(10) Patent No.: US 7,202,457 B2
(45) Date of Patent: Apr. 10, 2007

(54) DEVICE THAT AUTOMATICALLY TRACKS THE POSITION OF THE SUN

(75) Inventors: Elfi Janus, Willich (DE); Wolfram Berger, Koblenz (DE)

(73) Assignee: Giselher Fengler, Erkrath (DE)

( * ) Notice: Subject to any disclaimer, the term of this patent is extended or adjusted under 35 U.S.C. 154(b) by 0 days.

(21) Appl. No.: 10/516,653

(22) PCT Filed: May 28, 2002

(86) PCT No.: PCT/DE02/02328

§ 371 (c)(1),
(2), (4) Date: Aug. 31, 2005

(87) PCT Pub. No.: WO03/102477

PCT Pub. Date: Dec. 11, 2003

(65) Prior Publication Data

US 2006/0124827 A1    Jun. 15, 2006

(51) Int. Cl.
| | |
|---|---|
| G01C 21/02 | (2006.01) |
| G01C 21/24 | (2006.01) |
| G01J 1/20 | (2006.01) |
| F24J 2/38 | (2006.01) |
| H01L 31/042 | (2006.01) |
| H02N 6/00 | (2006.01) |

(52) U.S. Cl. .................. 250/203.4; 136/246; 126/576; 126/577; 126/605; 126/606

(58) Field of Classification Search ............. 250/203.4; 126/573–608; 136/246, 259
See application file for complete search history.

(56) References Cited

U.S. PATENT DOCUMENTS

| | | | | |
|---|---|---|---|---|
| 5,191,875 A | * | 3/1993 | Edling et al. ................ | 126/576 |
| 2002/0023638 A1 | * | 2/2002 | Buron et al. ................ | 126/601 |
| 2002/0139413 A1 | * | 10/2002 | Sasaki ........................ | 136/246 |

* cited by examiner

*Primary Examiner*—Stephone B. Allen
*Assistant Examiner*—Suezu Ellis
(74) *Attorney, Agent, or Firm*—Andrew Wilford

(57) ABSTRACT

A sun-position tracking system for a solar module has a base on which a rotary plate is supported. Several generally parallel fixed rods fixed to the plate have outer ends extending outward past the plate. A planar frame is pivoted on the rod outer ends about a generally horizontal frame axis between a down position with the frame lying on and substantially parallel to the plate and an up position extending at an acute angle to the plate. The solar module is carried on the frame and lies in a panel plane above the rods and plate. A sector gear fixed to the frame outside the outer edge of the plate and wholly below the plane is engaged by a pivot drive mounted on the rod outer ends and wholly below the plane the frame between its positions.

12 Claims, 4 Drawing Sheets

DEVICE THAT AUTOMATICALLY TRACKS THE POSITION OF THE SUN

CROSS REFERENCE TO RELATED APPLICATIONS

This application is the U.S. national phase of PCT application PCT/DE02/02328 filed 28 May 2002 with a claim to the priority of PCT patent application PCT/DE02/02328 itself filed 28 May 2002.

FIELD OF THE INVENTION

The present invention is directed to an automatically functioning sun-position tracking system for solar modules.

BACKGROUND OF THE INVENTION

It is known to guide solar modules (solar collectors, solar panels etc.) in response to the position of the sun in order to enable an optimum exposure to sunlight. Normally, it is desired to obtain a perpendicular impingement of the sunlight onto the plane of the solar module which assures the optimum energy yield. If this is not the case, i.e. if the solar rays impinge onto the plane of the solar module with a smaller angle or with a larger angle than 90°, the energy yield is lower.

Since, according to the time of the day, different angles of incidence of the solar rays are present the solar module has to follow the position of the sun. This can be carried out manually which, however, is troublesome and time consuming. However, automatically functioning sun-position tracking system for solar modules are known according to which the position of the sun is detected by means of a sensor, corresponding signals are generated in response thereto and are supplied to a control unit, and the control unit controls respective drive units for the solar module in response to these signals in order to move the solar module into an optimum position with regard to the sun.

OBJECT OF THE INVENTION

It is the object of the present invention to provide an automatically functioning sun-position tracking system for solar modules which is characterized by a compact and sturdy construction with small need of maintenance.

SUMMARY OF THE INVENTION

According to the invention this object is achieved by an automatically functioning sun-position tracking system for solar modules comprising a base for mounting the tracking system on a stationary or movable support, especially a vehicle;

a rotary plate rotationally supported on the base and driven by means of a rotary drive;

a pivot frame pivotally supported on the rotary plate and driven by means of a pivot drive and supporting at least one solar module; and an optical sensor generating signals in response to the position of the sun and supplying these signals to a control unit which controls the rotary drive and/or pivot drive.

The pivot frame includes at least one member fixed to the rotary plate and a pivot member pivotally supported on the member and carrying the solar module, the pivot drive is supported in the end portion of the member which is fixed to the rotary plate transversely with respect to the axis thereof and does not protrude upward beyond this member, and the pivot drive includes a motor, a reducing transmission and a transmission output shaft provided with teeth meshing with a sector gear connected to the pivot member of the pivot frame.

With the inventive sun-position tracking system it is possible to turn one or a plurality of solar modules (solar collectors, solar panels) about a vertical axis and to pivot them about a horizontal axis. This way, the solar module or the solar modules can be brought into a position in which the solar rays substantially perpendicularly impinge onto the plane of the modules so that in this manner an optimum energy conversion (into electrical current) can be obtained. The movement of the solar module or of the solar modules takes place automatically in response to the position of the sun and an optical sensor detects the position of the sun, generates corresponding signals and supplies the signals to the control unit. The control unit controls the rotary drive and/or pivot drive which generate the necessary movements of the solar module or the solar modules about the vertical axis and/or the horizontal axis for tracking the sun position.

The inventive sun-position tracking system can be fastened to a stationary or to a movable part. In an especially preferred manner it serves for the fastening to a vehicle, for instance a mobile home or a caravan, especially on its roof. The solar module or the solar modules can get power from the current supply of the mobile home or the caravan.

The inventive sun-position tracking system has a base for mounting to the stationary or movable part and a rotary plate rotatably supported on the base and driven by a rotary drive. A rotary movement of the rotary plate and thus of the solar module or of the solar modules about a vertical axis of rotation takes place by means of the rotary drive which is controlled by the control unit. A pivot frame is mounted on the rotary plate and can be pivoted up and brought into the corresponding pivot position by means of a pivot drive. The solar module or the solar modules are fastened to the pivot frame. The pivot frame can be moved from a position parallel to the rotary plate (with a pivot angle of 0°) into a pivoted-up position of about 90° and back again.

In principle, the pivot frame has a member fixed to the rotary plate and a pivot member pivotally supported at this member and carrying the solar module or the solar modules. It is essential that the pivot drive, which is mounted on the end portion of the member fixed to the rotary plate, i.e. in the end portion in which the pivot bearing between the two members is provided, does not protrude substantially beyond the upper side of the member fixed to the rotary plate in order to make it possible that solar modules can be provided along the whole length of the members and, on the whole, a low height of construction is achieved according to which no mechanical parts protrude upwardly in the pivoted-down condition. This way, the whole area above the members can be used for the arrangement of solar modules, and low moments occur when pivoting up. Furthermore, the wind forces attacking the tracking system are reduced which is especially of importance for the arrangement of the sun-position tracking system on the roof of a vehicle.

This desired compact construction is especially achieved by the design and arrangement of the pivot drive. The pivot drive is supported at the member fixed to the rotary plate transversely with respect to the axis (longitudinal axis) thereof and includes a motor, a reducing transmission and a transmission output shaft provided with teeth. A sector gear connected to the pivot member of the pivot frame engages the output shaft. The sector gear is designed and arranged in such a manner that it does not protrude upward beyond the pivot member. This would be the case with a normally designed gear with a full circular array of teeth.

When the motor (electrical motor) of the pivot drive is controlled the shaft thereof is rotated. With this transmission a gear reduction is achieved, preferably with a ratio of about 1:180. Accordingly, the output shaft of the transmission rotates substantially more slowly than the motor shaft and pivots the sector gear matching with the same and thus the pivot member with the solar module (solar modules) fixed thereto.

Preferably, the sector gear covers an arc of about 120°, i.e. a third of a circle. This way, the desired pivoting of the pivot member for at least 90° can be obtained without having an upward protrusion of the sector gear beyond the members and without making it impossible to mount solar modules in this area.

According to a further development of the invention the pivot member with the sector gear is supported between two members fixed to the rotary plate so they can be pivoted upwardly. In this manner, a support of the pivot member with sector gear on both sides and thus a sturdy construction is achieved. Practically, the motor, the reducing transmission and the transmission output shaft are supported on two members fixed to the rotary plate which have between them the teeth of the transmission output shaft. This way, a sturdy design of the pivot drive is achieved.

For example, the member fixed to the rotary plate and the pivot member can be formed as plate-like or rod-like members. The transverse extension of these members does not have any restrictions. Normally, the pivot frame extends transversely beyond the rotary plate. According to a preferred embodiment the members are formed as rods, i.e. the pivot frame includes at least one rod fixed to the rotary plate and at least one pivot rod. According to a special embodiment the tracking system includes four rods fixed to the rotary plate of which the two outer ones are pivotally connected to a respective pivot rod and the two inner ones are pivotally connected to the pivot rod having the sector gear. Especially, two solar panels are fastened to the pivot rods and form the connection between the driven pivot rod (the pivot rod provided with the sector gear) and the two other pivot rods.

Accordingly, the pivot frame, the pivot drive and the rotary plate form a unit rotationally supported on the base. Preferably, the rotary plate is rotatably supported on the base by means of balls held in an annular groove.

Preferably, the base consists of a bottom plate, a housing mounted thereon and a fixed plate mounted thereon for the support of the rotary plate. Half of the annular groove is formed in the fixed plate and half in the rotary plate. For example, the bottom plate can be connected by screwing, bonding etc. to the roof of a vehicle (mobile home, caravan). Practically, the rotary drive is contained in the housing mounted on the bottom plate and has a motor (electrical motor), a reducing transmission and a drive screw which is in engagement with a drive gear for the rotary plate. The drive gear is connected to a hollow hub which extends through the fixed plate and is connected to the rotary plate.

Suitable limit switches limiting the angle of rotation or the pivot angle are provided for the rotary drive and for the pivot drive.

Preferably, the optical sensor is mounted on the solar module (solar panel). Furthermore, the pivot frame preferably carries two solar panels of which the upper one in the pivot position carries the optical sensor. The optical sensor and the limit switches for the rotary drive and pivot drive supply corresponding signals to a control unit (CPU) which controls the two motors for the pivot drive and rotary drive and is in functional connection with an operation panel with display which enables at least a manual switching-on and switching-off of the tracking system and has, for example, a display with luminescence diodes which indicates the correct position of the tracking system relative to the position of the sun.

The optical sensor enables an especially exact detection of the position of the sun with a simple and compact construction. Preferably, it comprises the following components:
a base,
a separation means arranged on the base and separating the space above the base into a plurality of upwardly and laterally open compartments,
at least one light-receiving means in each compartment which converts light into electrical current, and
electrical lines connected to the light-receiving means and leading to a control/evaluation/display unit.

This design is based on the basic idea of providing the separation means mounted on the base with means which throws a shadow in response to the position of the sun which covers one compartment or a plurality of compartments and thus the at least one light-receiving means mounted in each compartment.

Accordingly, dependent on the position of the sun the separation means can generate no shadow at all if the sun is positioned exactly vertically above the sensor and thus above the separation means or if, moreover, equal light conditions are present, as for instance in the night, with diffuse light etc., or the separation means can throw a shadow if its longitudinal axis forms an angle with the axis corresponding to the position of the sun. In this case, one compartment or a plurality of compartments and thus the corresponding light-receiving means of the associated compartments are covered by the shadow generated by the separation means and thus do not generate electrical signals while the other compartments and associated light-receiving means are free of shadow and generate electrical signals.

The electrical signals are supplied to a control unit which, in response to the received signals, operates the rotary drive and/or pivot drive which guide the solar module relative to the position of the sun, i.e. bring it into an optimum position with respect to the sun, in which the solar rays impinge approximately vertically onto the surface of the solar module (surface of the solar panel).

Of course, the corresponding electrical signals are evaluated in a suitable manner before they fulfill their control functions.

If, for instance, the sensor and thus the separation means are aligned in such a manner that the axes of the sensor and of the separation means extend exactly parallel with respect to the solar rays at the highest position of the sun (noon), in this case all the light-receiving means are in operation with a corresponding sun radiation and show the optimum position of the sun. Accordingly, movement of a corresponding solar module is not necessary. If the angle of the sun radiation relative to the axis of the sensor changes, the separation means throws shadow onto one or several compartments so that one or several light-receiving means are set out of operation which, as cited above, is indicated or results in a tracking of the corresponding solar module until the optimum position is achieved again.

Preferably, the separation means divides the space above the base into four compartments. It forms a so-called "shadow cross" with which especially good results are obtained with regard to the operability of the sensor.

Practically, a light-receiving means is arranged in each compartment. This arrangement is sufficient to provide a sufficiently exact indication and control.

Preferably, a photodiode is used as light-receiving means.

For the practice an embodiment has shown to be especially suited according to which the sensor has an approximately square base in horizontal cross-section and a separation means with walls arranged along the diagonals of the base. Accordingly, the separation means forms a "shadow cross" approximately corresponding to a St. Andrews cross in horizontal cross-section. Four triangular compartments are formed in each of which a respective photodiode is mounted at a suitable spacing from the walls of the shadow cross. The photodiodes are fixed at the base and the respective electrical lines are combined within the base and extend outwardly of the base through an electrical cable. The cable is in connection with a suitable control/evaluation/display unit.

Practically, the sensor is provided at the solar module itself which is rotatably and pivotally arranged, i.e. it is synchronously moved into the optimum position of the solar module relative to the sun. Accordingly, the position of the sensor always exactly corresponds to the position of the solar module.

It can be generally stated: If all the light-receiving means are illuminated with the same intensity (with sun radiation, diffused light, during the night) the associated control unit does not generate commands for the tracking of the solar module. Such control commands are generated only if brightness differences occur between the several compartments (light-receiving means). If such a difference occurs, preferably both drive means, i.e. the rotary drive and the pivot drive, are controlled (in a zigzag course) in order to aim at the sun. Preferably, such a control unit is provided with a means for the suppression of oscillations in order to avoid a permanent movement of the drive means back and forth.

BRIEF DESCRIPTION OF THE DRAWING

In the following the invention is described by means of an example in connection with the drawings in detail. In the drawings

SPECIFIC DESCRIPTION

Figure 1:
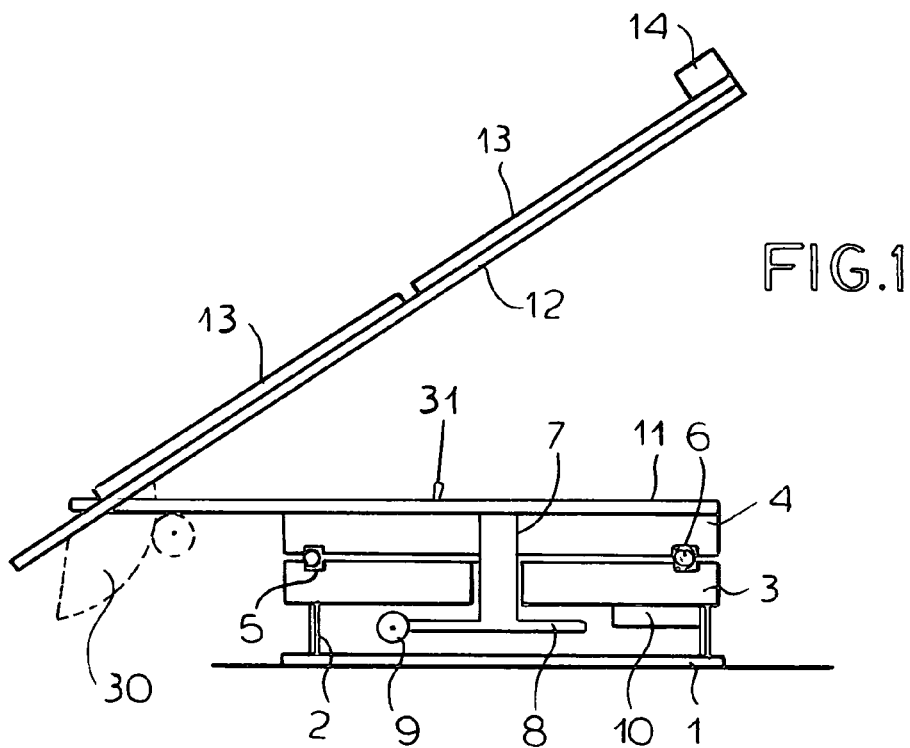
FIG. 1 shows a vertical section through an automatically operating sun-position tracking system for solar modules.
Figure 2:
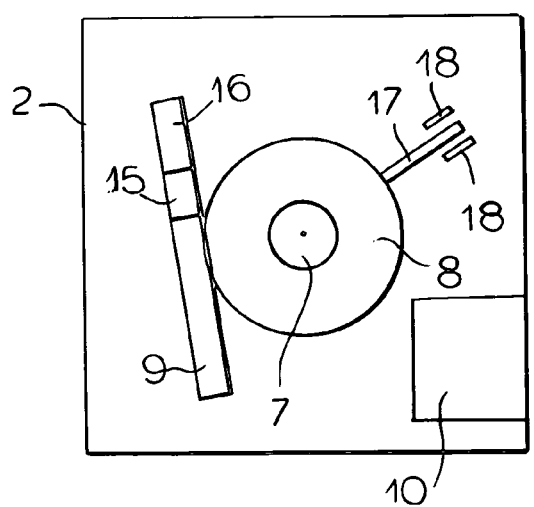
FIG. 2 shows a top view on the housing of the tracking system of FIG. 1 with its cover removed.

The sun-position tracking system for solar modules shown in FIG. 1 has a base consisting of a bottom plate 1, a housing 2 and a plate 3 mounted on the housing. A rotary plate 4 is rotatably supported on the base and carries a pivot frame 31 on which two solar panels 13 are mounted. These solar panels 13 convert sunlight into electrical current which, for instance, can serve to power a vehicle on whose roof the system is mounted.

For the installation of the tracking system the bottom plate 1 is bonded or screwed to the roof of the vehicle. Dependent on signals generated by an optical sensor 14 which is mounted on the upper solar panel 13 a rotary drive for rotating the rotary plate 4 and a pivot drive for upwardly and downwardly pivoting the pivot frame 31 are operated in order to adjust an optimum condition of the solar panels 13 relative to the sun (vertical impingement of the solar rays on the panel plane).

The rotary drive for the rotation of the rotary plate 4 is mounted in the housing 2 supported on the bottom plate 1. The rotary drive comprises an electrical motor 16, a reducing transmission 15 and a drive screw 9 which are arranged along an axis. The screw 9 meshes with a drive gear 8 which is fixed to a hollow hub 7. The hollow hub extends upwardly through the fixedly installed plate 3 and is fixed to the rotary plate 4. Accordingly, rotation of the drive gear 8 generated by the drive screw 9 causes rotation of the rotary plate 4. The rotary plate 4 is supported on the fixed plate 3 by means of balls 5 which are housed in an annular groove 6 formed by two half-grooves each formed in a respective one of the plates and 4.

Rotation of the drive gear 8 is limited by limit switches 18 which are contacted by a lever 17 which is guided by a pin in a screw groove formed in the lower side of the drive gear 8.

Accordingly, the drive gear 8 rotate through 3700 from abutment to abutment.

Furthermore, a box 10 is arranged within the housing 2 and houses a control unit 10 controlling the rotary drive and the pivot drive and to which are fed signals from the limit switches of the rotary drive and the pivot drive as well as from the optical sensor. Furthermore, the control unit 10 is connected to an operation panel with a display. The corresponding connecting electrical lines are not shown.

The pivot drive for upwardly and downwardly pivoting the pivot frame 31 is only schematically shown in FIG. 1 at 30. A more exact description of the pivot drive 30 follows in connection with FIGS. 3 and 4.

If a signal of the optical sensor 14 is supplied through the control unit 10 which calls for a tracking of the system by rotary movement of the rotary plate 4, the motor 16 is controlled by the control unit 10. The output shaft of the motor is rotated. A corresponding gear reduction is carried out by the transmission 15 so that the drive screw 9 has a substantially lower speed. The drive screw 9 drives the drive gear 8 in the selected direction. Rotation of the gear 8 results in a rotation of the rotary plate 4 in a manner determined by the control of the control unit 10 or by the limit switches 18. The rotary plate 4 is rotated fore and back as long as it takes in the optimum rotary position for the position of the sun.

Figure 3:
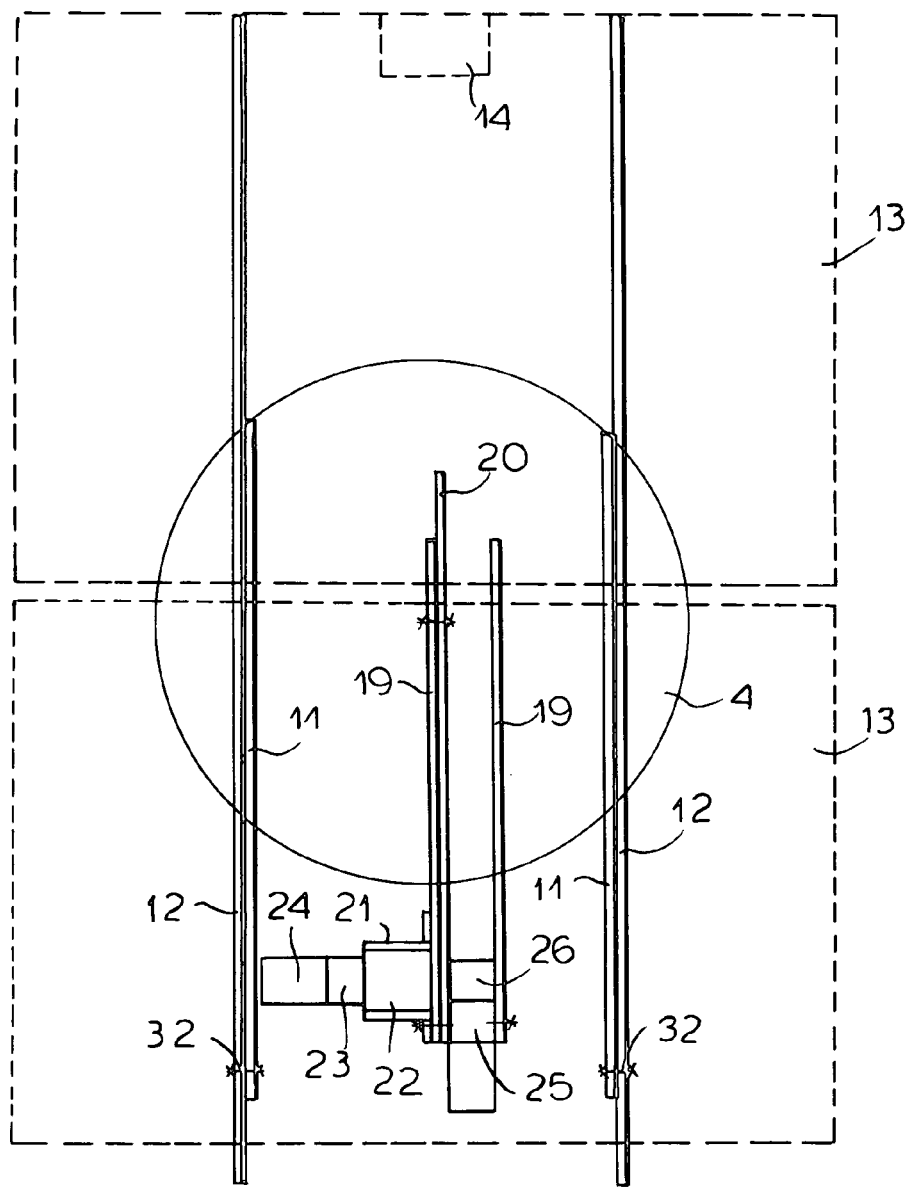
FIG. 3 shows a top view of the structure of FIGS. 1 and 2.

FIG. 3 shows a top view of the rotary plate 4 on which the pivot frame 31 is fastened. The two solar panels 13 which are fixed at the pivot frame 31 are only shown by dashed lines.

The pivot frame 31 has two outer pivot rods 12 which are each pivotally connected at 32 to a respective rod 11 fixed to the rotary plate 4. Furthermore, the pivot frame 31 has a third approximately centrally arranged pivot rod 20 which is connected to the pivot drive 30 and is pivoted by it. Its pivotal movement is transferred to the solar panels 13 on the two outer pivot rods 12. The central pivot rod 20 is pivotally connected to two inner rods 19 fixed to the rotary plate 4.

Accordingly, on the whole seven rods are provided, namely three pivot rods 12 and 20 and four fixedly installed rods 11 and 19. The two solar panels 13 are fastened at the three pivot rods 13 and 20, and the four rods 11 and 19 are fixed to the rotary plate 4.

Furthermore, the central pivot rod 20 is connected to a sector gear 25 which approximately corresponds to a third of a circle. This sector gear 25 and also the further parts of the pivot drive 30 do not protrude past upper sides of the pivot rods so that the solar panels 13 cover the pivot drive 30 and can extend along the whole length of the pivot rods 12. This way, in the collapsed condition of the pivot frame 31 no parts protrude upwardly beyond the rods 11, 12, 19, and 20, and solar panels 13 with an area as large as possible can be installed.

Figure 4:
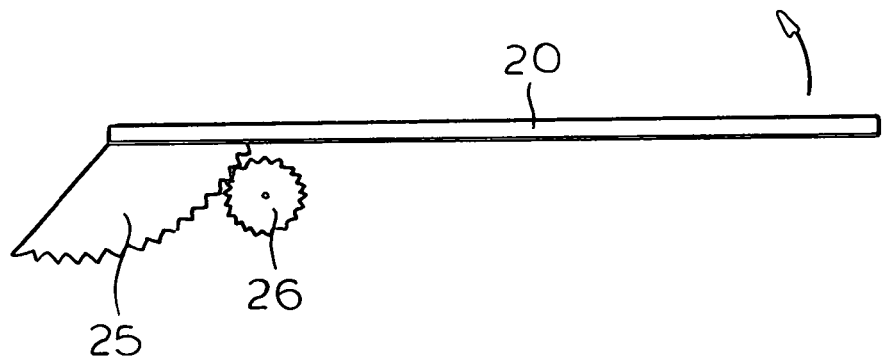
FIG. 4 shows a detailed view of a part of the pivot drive.

As shown in the detailed view of FIG. 4 the sector gear 25 is in engagement with the teeth of a transmission output shaft 26 of the pivot drive 30. By rotation of the shaft 26 the rod 20 is pivoted up and down so that the solar panels are brought into the optimum position relative to the sun. The transmission output shaft 26 extends out of a reducing transmission 22 which is connected to an electrical drive motor 24 through another reducing transmission 23. The motor 24, the two reducing transmissions 23 and 22 and the transmission output shaft 26 are centered on a common axis. The whole drive means is connected by a flange 21 to the stationary rods 19. The transmission output shaft 26 is journaled on the two stationary rods 19 by means of suitable bearings (not shown).

If the pivot motor 24 is actuated by the control unit 10, its output shaft is rotated. A gear reduction of about 1:180 is obtained by the two reducing transmissions 23 and 22 which results in a very slow rotary movement of the toothed transmission output shaft 26. This shaft 26 is in engagement with the sector gear 25 and brings the pivot rod 20 and thus the solar panels 13 into the desired pivot position in this manner. Pivoting back is carried out vice versa. Suitable limit switches are also provided for limiting the pivot movement of the pivot frame 31.

Accordingly, an automatically operating sun-position tracking system for solar modules is described according to the invention which is largely maintenance-free on account of its mechanical drive and which has a very compact construction. Accordingly, solar panels 13 with a large surface can be used, and the system only generates a small wind resistance. A low construction height is obtained. The system is formed in an especially sturdy manner.

Figure 5:
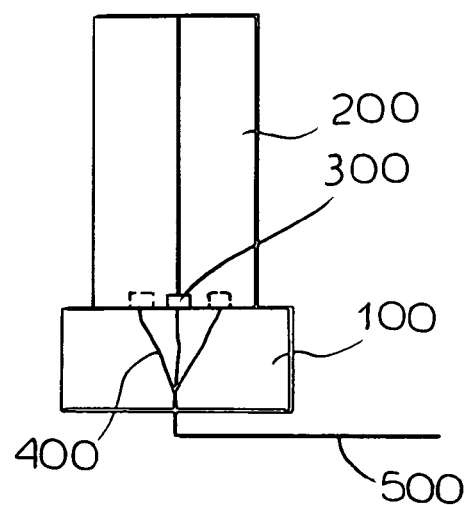
FIG. 5 shows a schematic side view of an optical sensor for the detection of the position of the sun.
Figure 6:
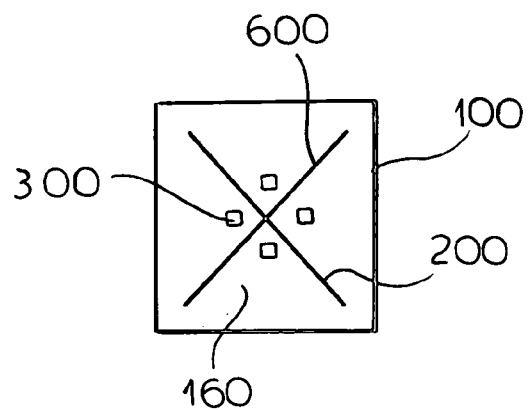
FIG. 6 shows a top view of the sensor of FIG. 5.

The optical sensor shown in FIGS. 5 and 6 has a base 100 which is only schematically shown as a pedestal. Its base is designed hollow in order to hold the necessary wiring. On its lower side it has a cable outlet. According to this embodiment the base is approximately square in horizontal cross-section.

A separation means formed by upstanding partitions 200 is mounted on the base 100. In a horizontal cross-section the separation means has the shape of a St. Andrews cross. The separation means 200 forms four compartments 160 which are triangular in horizontal cross-section and which are upwardly and laterally outwardly open. Accordingly, sunlight can enter these compartments from above and from the side. The two other sides of the triangle which correspond to the diagonals of the base are occupied by the walls 600 of the separation means 200 and thus shield the respective compartment 160 with regard to sunlight.

A respective light-receiving means 300 formed as photodiode is mounted in each compartment 160 at a suitable distance from the separation means 200. Upon irradiation with sunlight the photodiode 300 generates electrical signals which are supplied to an appropriate control unit through electrical conductors 400 which are combined in an electrical cable 500.

The separation means 200 has a suitable height in order to throw a shadow of the separation means 200 onto one compartment or a plurality of compartments and thus onto the light receiving means 300 mounted there upon an inclined position of the sun relative to the vertical axis of the sensor. The exact height can be determined empirically.

Figure 7:
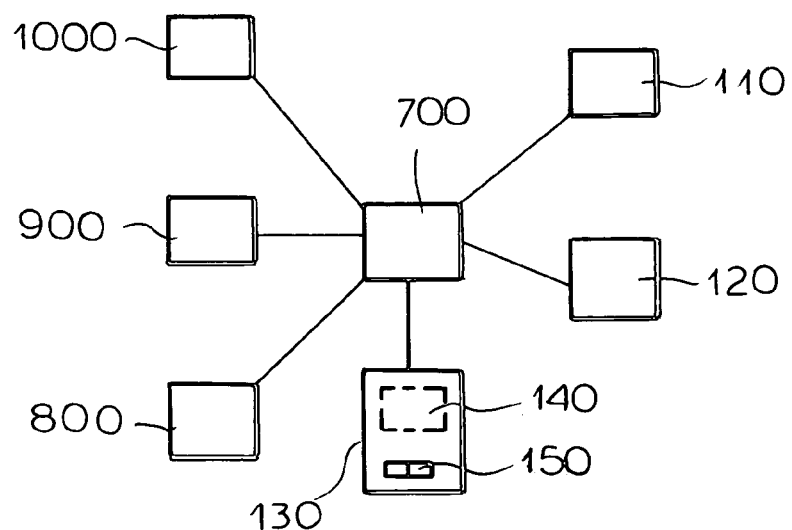
FIG. 7 shows a block circuit diagram of a sun-position tracking system in which the sensor of FIGS. 5 and 6 is used.

FIG. 7 shows the sensor of FIGS. 5 and 6 as part of a sun-position tracking system. The sensor is indicated at 800 and is mounted on the rotatably and pivotally movable solar module. The corresponding signals of the sensor 800 are supplied to a control unit 700 (central processing unit, CPU) which also receives signals from the switches 900, 1000 of the rotary drive and pivot drive 30, evaluates the received signals and outputs corresponding control command signals to the rotary drive 110 as well as the pivot drive 30 120. Furthermore, the control unit 700 supplies signals to an indicating/operating unit 130. This unit 130 has a display 140 and an on/off-switch 150.

The whole system operates as follows:

The user switches on the system with the switch 150. The sensor 800 detects the position of the sun and applies corresponding signals to the control unit 700. These signals are shown in the display 140. Furthermore, if necessary, corresponding command signals are generated which are supplied to the rotary drive 110 and/or the pivot drive here shown at 120 which cause a tracking of the solar module. The provided limit switches 900, 1000 terminate the corresponding movements of the solar module.

The invention claimed is:

1. A sun-position tracking system for a solar module, the system comprising:
    a base;
    a rotary plate rotatable on the base about an upright plate axis;
    rotary drive means for rotating the plate on the base about the upright plate axis;
    a plurality of generally parallel fixed rods fixed to the plate and having outer ends extending outward past the plate;
    a substantially planar frame pivoted on the outer ends about a generally horizontal frame axis between a down position with the frame lying on and substantially parallel to the plate and an up position extending at an acute angle to the plate, the solar module being carried on the frame and lying in a panel plane above the rods and plate;
    a sector gear fixed to the frame outside the outer edge of the plate and wholly below the plane;
    pivot drive means mounted on the outer ends and wholly below the plane and connected to the sector gear for pivoting the frame between its positions;
    an optical sensor mounted on the frame and responsive to sunlight; and
    control means connected to the optical sensor and to the rotary and pivot drive means for orienting the frame and the solar module thereon with respect to the sun.

2. The sun-position tracking system according to claim 1 wherein the sector gear extends over an arc of about 120°.

3. The sun-position tracking system according to claim 1 wherein the plurality of fixed rods includes two outer rods pivotally connected to the frame and two inner rods between the outer rods, flanking the sector gear, and carrying the pivot drive means.

4. The sun-position tracking system according to claim 1 wherein the rotary plate is rotatably supported on the base by means of balls riding in an annular groove.

5. The sun-position tracking system according to claim 1 wherein the base consists of a bottom plate, a housing mounted thereon and a fixed plate mounted thereon supporting the rotary plate.

6. The sun-position tracking system according to claim 5 wherein the rotary drive and the control means are mounted in the housing of the base.

7. The sun-position tracking system according to claim 1 wherein the rotary drive means includes a motor, a reducing transmission and a drive screw meshing with a drive gear for the rotary plate.

8. The sun-position tracking system according to claim 1 wherein the optical sensor includes
   a sensor base,
   upstanding partitions on the sensor base and dividing a space above the sensor base into a plurality of upwardly and laterally open compartments,
   a respective light-receiving means in each compartment which converts light into electrical current, and
   electrical lines connected to the light-receiving means and extending to a control/evaluating/indicating unit.

9. The sun-position tracking system according to claim 8, wherein the partitions divide the space above the sensor base into four of the compartments.

10. The sun-position tracking system according to claim 8 wherein each light-receiving means is a photodiode.

11. The sun-position tracking system according to claim 8 wherein the sensor base is approximately square in horizontal section and the partitions extend along diagonals of the sensor base.

12. The sun-position tracking system defined in claim 1 wherein the pivot drive means further comprises, all mounted below the plane between the two fixed rods:
   a motor;
   a speed-reducing transmission connected to the motor;
   a toothed output connected through the transmission to the motor and meshing with the sector gear.

* * * * *